United States Patent
Komiyama et al.

(10) Patent No.: US 7,745,947 B2
(45) Date of Patent: Jun. 29, 2010

(54) HYBRID WORKING MACHINE

(75) Inventors: Masayuki Komiyama, Hiroshima (JP); Masayuki Kagoshima, Hiroshima (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 427 days.

(21) Appl. No.: 11/875,340

(22) Filed: Oct. 19, 2007

(65) Prior Publication Data
US 2008/0093865 A1   Apr. 24, 2008

(30) Foreign Application Priority Data
Oct. 20, 2006 (JP) .............................. 2006-286842
Aug. 3, 2007 (JP) .............................. 2007-203114

(51) Int. Cl.
*F02C 9/00* (2006.01)
*B60K 1/00* (2006.01)

(52) U.S. Cl. ..................... 290/40 C; 290/1 A; 180/307; 701/50

(58) Field of Classification Search .................. 290/1 R, 290/1 A, 4 R, 40 R, 40 C; 180/307; 701/50
See application file for complete search history.

(56) References Cited

U.S. PATENT DOCUMENTS

| 5,913,811 | A | * | 6/1999 | Kinugawa et al. ............... 60/420 |
| 5,991,677 | A | * | 11/1999 | Kinugawa et al. ............... 701/50 |
| 5,999,872 | A | * | 12/1999 | Kinugawa et al. ............... 701/50 |
| 6,054,776 | A | * | 4/2000 | Sumi ........................... 290/17 |
| 6,635,973 | B1 | * | 10/2003 | Kagoshima et al. ........... 307/10.1 |
| 6,666,022 | B1 | * | 12/2003 | Yoshimatsu et al. ............ 60/413 |
| 6,789,335 | B1 | * | 9/2004 | Kinugawa et al. .............. 37/348 |
| 6,864,663 | B2 | * | 3/2005 | Komiyama et al. ............ 320/104 |
| 6,989,640 | B2 | * | 1/2006 | Yoshimatsu .................. 318/34 |
| 7,069,673 | B2 | * | 7/2006 | Kagoshima et al. ............ 37/348 |
| 7,143,859 | B2 | * | 12/2006 | Ohtsukasa .................... 180/307 |
| 7,388,301 | B2 | * | 6/2008 | Komiyama et al. ......... 290/40 C |
| 7,487,023 | B2 | * | 2/2009 | Komiyama et al. ............ 701/50 |
| 7,525,206 | B2 | * | 4/2009 | Kagoshima et al. ........ 290/40 C |
| 7,559,271 | B2 | * | 7/2009 | Komiyama et al. ............ 91/529 |

FOREIGN PATENT DOCUMENTS

| JP | 11-13548 | 1/1999 |
| JP | 2001-12259 | 1/2001 |
| JP | 2004-150305 | 5/2004 |

OTHER PUBLICATIONS

U.S. Appl. No. 12/581,299, filed Oct. 19, 2009, Kagoshima et al.

* cited by examiner

*Primary Examiner*—Nicholas Ponomarenko
(74) *Attorney, Agent, or Firm*—Oblon, Spivak, McClelland, Maier & Neustadt, L.L.P.

(57) ABSTRACT

The present invention is to drive a hydraulic pump and a generator motor by an engine, to electrically charge a battery by a generator action of the generator motor, and to drive the generator motor by electric power of the battery so as to assist the engine. A governor position is changed by operations of a potentiometer for accelerator and a mode selection switch so as to control rotation speed of the engine. On the premise of the above configuration, generator output is limited by a controller at the time of accelerating the engine until the rotation speed of the engine reaches set speed determined on the basis of the operations of the potentiometer for accelerator and the mode selection switch, and hence engine load is reduced so as to assist acceleration.

8 Claims, 5 Drawing Sheets

HYBRID WORKING MACHINE

BACKGROUND OF THE INVENTION

1. Field of the Invention

The present invention relates to a hybrid working machine using both engine power and electric power.

2. Description of the Related Art

THE RELATED ART will be described taking an excavator of a preferred example of the present invention as an example.

The excavator is, as shown in FIG. 6, formed by rotatably mounting an upper rotating body 2 on a crawler type lower traveling body 1 and attaching a working attachment 3 to the upper rotating body 2.

The working attachment 3 is formed by a boom 4 capable of raising and lowering, an arm 5 attached to an end of the boom 4, a bucket 6 attached to an end of the arm 5, a boom cylinder 7, an arm cylinder 8 and a bucket cylinder 9 serving as hydraulic actuators for driving the boom, the arm and the bucket.

As an actuator for rotating the upper rotating body 2, a hydraulic motor is used in the case of a hydraulic excavator, and a rotation motor serving as an electric actuator is used in the case of a hybrid excavator.

In the hybrid excavator, there is a known hybrid excavator having a so called parallel type drive mode (refer to Japanese Patent Laid-Open No. Hei11-13548).

In the above type, a hydraulic pump and a generator motor for performing a generator operation and a motor operation are connected to an engine serving as a common power source in parallel so as to drive a hydraulic actuator by the hydraulic pump, and meanwhile to drive a rotation generator by the generator operation of the generator motor or an electric storage device.

The electric storage device is electrically charged by a generator action of the generator motor. The generator motor timely performs a motor action by discharge power of the electric storage device so as to assist the engine.

Meanwhile, rotation speed of the engine is controlled by operating accelerator operating means and hence changing a governor position (a fuel injection amount), and in general, a power generation amount of the generator motor is changed in accordance with the governor position and a load level (refer to Japanese Patent Laid-Open No. 2004-150305).

It should be noted that as a method for controlling the rotation speed of the engine, there is a general method for controlling and making actual rotation speed of the engine to be target rotation speed in relation to an accelerator operation amount (governor position) on the basis of the time of no load, and changing the rotation speed of the engine in accordance with a governor characteristic at the time of load imposed. However, there is sometimes a case where the actual rotation speed of the engine is controlled so as to correspond to the target rotation speed irrespective of the load (refer to Japanese Patent Laid-Open No. 2001-12259).

In the above hybrid excavator, at the time of operating the generator of the generator motor (at the time of electrically charging the electric storage device), even if the operation is stopped, there is a state that the load is imposed on the engine by the generator action.

Therefore, in the case where an accelerating operation of the engine is performed in the above state, it is not possible to use torque which is sufficient for accelerating the engine and hence it takes time for the acceleration.

Moreover, by the accelerating operation, control for increasing a power generation amount in accordance with the governor position is performed as mentioned above. Therefore, the rotation speed of the engine is not increased while the engine load is further increased. As a result, there is a possibility that the engine cannot be accelerated or engine failure is caused.

SUMMARY OF THE INVENTION

It is an object of the present invention to provide a hybrid working machine capable of surely accelerating an engine without prevention by a generator action of a generator motor.

Firstly, the hybrid working machine according to the present invention has the following basic configuration.

A hybrid working machine comprises a hydraulic pump for driving a hydraulic actuator, a generator motor for performing a generator action and a motor action, an engine serving as a common power source for the hydraulic pump and the generator motor, and an electric storage device electrically charged by the generator action of the generator motor, the electric storage device being configured such that the generator motor is driven by electric power of the electric storage device so as to perform the motor action. Further, the hybrid working machine is provided with accelerator operating means, and a fuel injection amount is changed by an operation of the accelerator operating means so as to control rotation speed of the engine. In addition, the hybrid working machine is provided with generator output controlling means for controlling generator output of the generator motor. The generator output controlling means is configured so as to limit the generator output in a process of accelerating the engine to set speed determined on the basis of the operation of the accelerator operating means.

According to the present invention, since the generator output is limited to output which does not disturb the acceleration of the engine, in a process where the engine is accelerated to the set speed (duration until reaching the set speed in a preferred example mentioned later), it is possible to ensure an acceleration action of the engine.

Further, the present invention is configured such that in the above configuration, the generator output controlling means is configured so as to limit the generator output at the time of accelerating the engine until the rotation speed of the engine reaches the set speed.

Further, the present invention is configured such that in the above configuration, the generator output controlling means is configured so as to release the limit of the generator output before the rotation speed of the engine reaches the set speed and after the lapse of a maximum set time preset as the sufficient duration for reaching the set speed from the beginning of acceleration.

Here, according to the present invention having the above configuration, in the case where the rotation speed of the engine does not reach the set speed for reaching a fixed time from the beginning of acceleration (essentially set as the duration which is sufficient for reaching the set speed) for example due to an influence of an increase in load of oil taking at the time of a low temperature, a decrease in engine output caused by operation at a high altitude or the like, it is thought that there is a cause of unfinished acceleration of the engine other than the generator action and hence meaningless limit of the generator output is stopped. Therefore, it is possible to ensure an electrically charging action.

Further, the present invention is configured such that in the above configuration, the generator output controlling means is configured so as to release the limit of the generator output at the time of accelerating the engine when the rotation speed of the engine reaches the set speed and after the lapse of a minimum set time preset as the minimum necessary duration for reaching the set speed and stabilizing from the beginning of acceleration of the engine.

When the acceleration of the engine is finished, in theory the limit of the generator output may be released immediately. However, in such a way, due to a change of the rotation speed of the engine, the limit/release of the generator output has to be repeated and there is a fear that the control is unstable.

At this point, according to the present invention having the above configuration, the limit of the generator output is released when the acceleration is finished and after the lapse of a minimum set time (the minimum necessary duration for reaching the set speed and stabilizing from the beginning of acceleration). Therefore, it is possible to stabilize the control.

Further, the present invention is configured such that in the above configuration, the generator output controlling means is configured so as to release the limit of the generator output at the time of accelerating the engine at the earlier timing among the following:

(I) when the rotation speed of the engine reaches the set speed and after the lapse of a minimum set time preset as the minimum necessary duration for reaching the set speed and stabilizing from the beginning of acceleration of the engine; and (II) before the rotation speed of the engine reaches the set speed and after the lapse of a maximum set time preset as the sufficient duration for reaching the set speed from the beginning of acceleration.

In this case, both the effects mentioned above of the present invention which are configured so as to release the limit of the generator output.

Further, the present invention is configured such that in any of the above configurations, the generator output controlling means is configured so as to limit the generator output taking target rotation speed for controlling the rotation speed of the engine preset in relation to an operation amount of the accelerator operating means as the set speed for limiting the generator output.

In this case, the target rotation speed for controlling the rotation speed of the engine is utilized as the set speed for limiting the generator output. Therefore, it is possible to omit separate setting means for determining the set speed.

Here, there is sometimes a case where the rotation speed of the engine takes a long time before reaching the target rotation speed. In such a case, the limit of the generator output, that is, a state of insufficient electrically charging is meaninglessly prolonged for a long time, and hence there is a possibility that a state of electrically charging the electric storage device is deteriorated.

Further, the present invention is configured such that in any of the above configurations, the generator output controlling means is configured so as to limit the generator output taking speed which is smaller than and the nearest from target rotation speed for controlling the rotation speed of the engine preset in relation to an operation amount of the accelerator operating means as the set speed.

In this case, the generator output is limited taking the speed which is smaller than and the nearest from the target rotation speed of the engine (the speed is represented by "the target rotation speed–N". N denotes a value which is smaller than a change amount of the rotation speed of the engine due to the load at a governor position at the time) as the set speed. Therefore, it is possible to avoid a situation that the limit endlessly continues and the state of electrically charging the electric storage device is deteriorated.

Further, the present invention is configured such that in any of the above configurations, the generator output controlling means is configured so as to limit the generator output taking rotation speed of the engine for limiting the generator output preset in relation to an operation amount of the accelerator operating means as the set speed, aside from target rotation speed for controlling the rotation speed of the engine.

In this case, the rotation speed of the engine for limiting the generator output is taken as the set speed, aside from the target rotation speed of the engine. Therefore, it is possible to select optimum speed in accordance with an action content or the like as the set speed for limiting the generator output irrespective of the target rotation speed of the engine.

DESCRIPTION OF THE PREFERRED EMBODIMENTS

Embodiments of the present invention will be described with reference to FIGS. 1 to 5.

Figure 1:
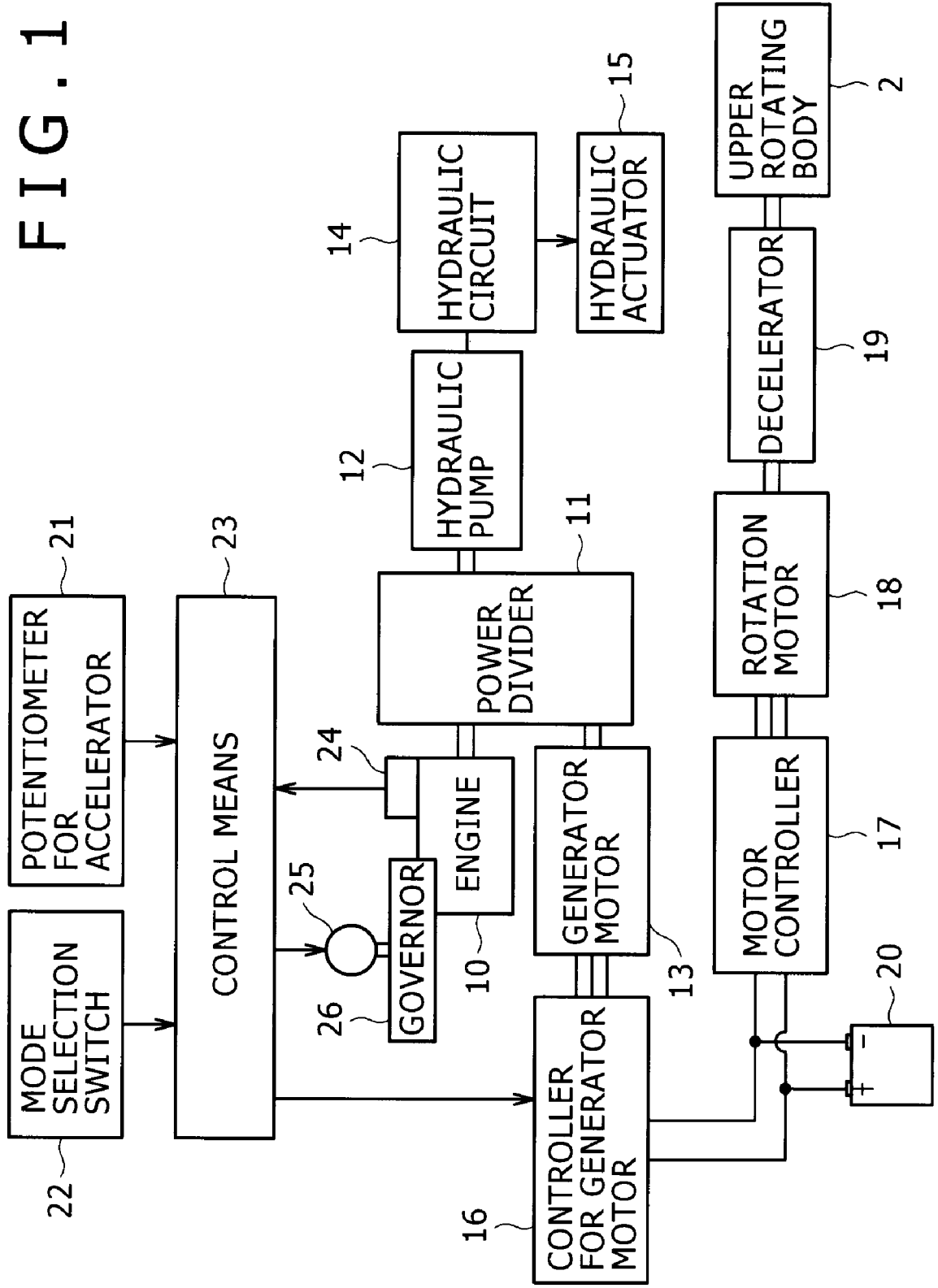
FIG. 1 is a block configuration diagram of a hybrid excavator according to embodiments of the present invention.

FIG. 1 shows a block configuration of a hybrid excavator according to the embodiments.

As shown in the figure, a variable capacity type hydraulic pump 12 and a generator motor 13 for performing a generator operation and a motor operation are connected to an engine 10 in parallel through a power divider 11, and driven by the engine 10.

Figure 6:
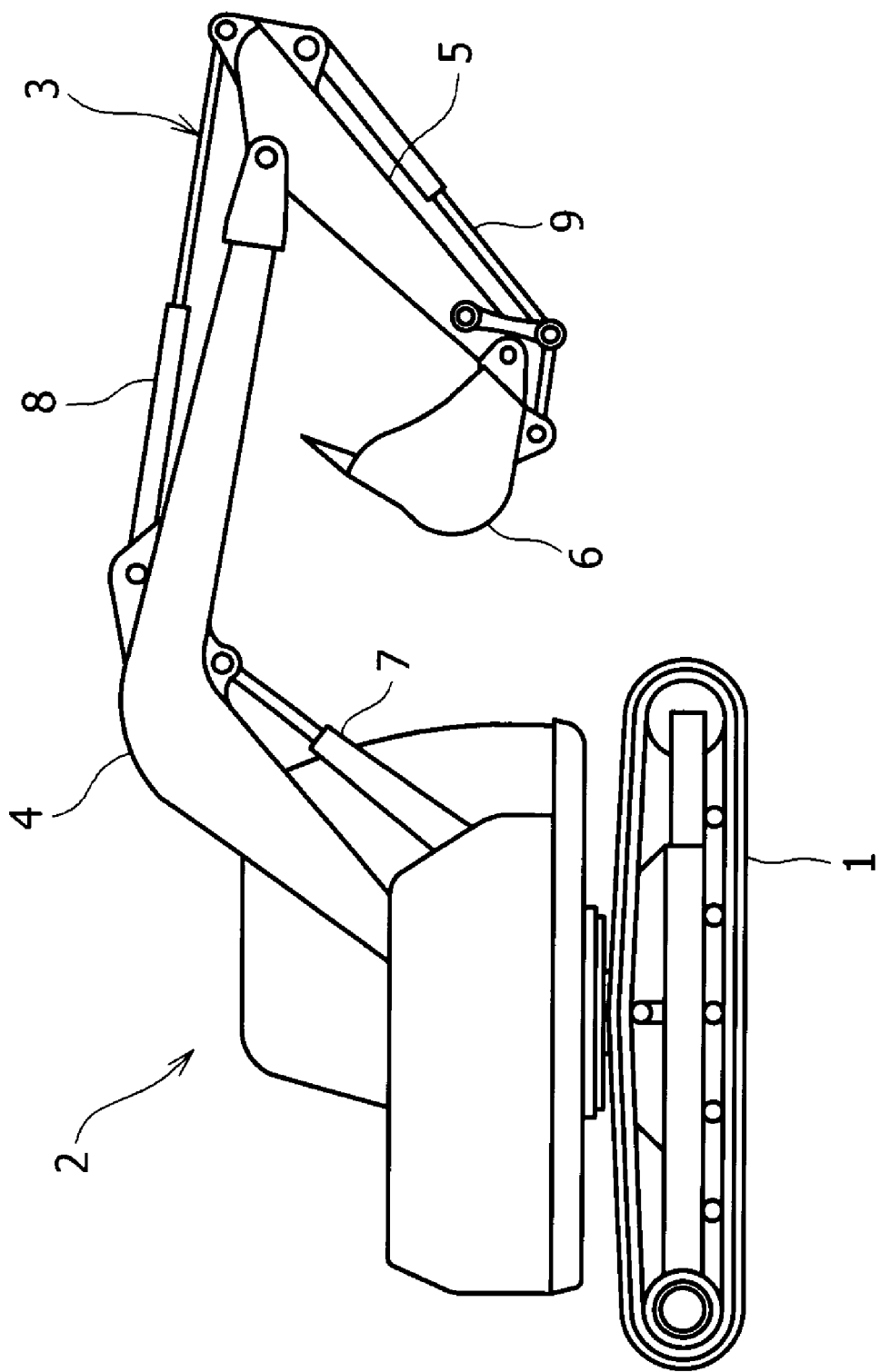
FIG. 6 is a schematic side view of an excavator serving as an example to which the present invention is applied.

A hydraulic circuit 14 is connected to the hydraulic pump 12, and hydraulic actuators such as a boom cylinder 7 in FIG. 6 (in FIG. 1, integrally represented by the reference numeral 15) are driven by pressure oil from the hydraulic pump 12. It should be noted that although the case where one hydraulic pump 12 is connected is shown in FIG. 1, there is sometimes a case where a plurality of hydraulic pumps are connected in parallel.

Electric power from the generator motor 13 is sent to a rotation motor 18 through a controller for generator motor 16 and a motor controller 17. Rotational force of the rotation motor 18 is transmitted to an upper rotating body 2 in FIG. 4 through a decelerator 19 so that the upper rotating body 2 is rotated.

Meanwhile, to the generator motor 13, is connected a battery 20 serving as an electric storage device which is a second power source of the rotation motor 18 (for example, lithium ion electric condenser) through the controller for generator motor 16.

The battery 20 is electrically charged by the generator action of the generator motor 13. The generator motor 13 timely performs the motor action by discharge power of the battery 20 so as to assist the engine.

The controller for generator motor 16 controls the generator motor 13 in terms of switching between the generator action and the motor action, generated electric power, and current or torque when serving as the generator. The controller for generator motor 16 also controls electric charge and discharge of the battery 20 in accordance with excess or deficiency of generator output of the generator motor 13.

The motor controller 17 controls current or torque of the rotation motor 18.

Meanwhile, as accelerator operating means for changing rotation speed of the engine 10, are provided a potentiometer for accelerator 21 (sometimes called as fuel dial and the like) and a mode selection switch 22. By operating the potentiometer for accelerator 21 and the mode selection switch 22, the rotation speed of the engine is controlled as shown in FIG. 2.

As a method for controlling the rotation speed of the engine, there is a general method of making actual rotation speed of the engine at the time of no load to be target rotation speed, and changing the rotation speed of the engine in accordance with a governor characteristic of the engine at the time of load imposed. As shown in Japanese Patent Laid-Open No. 2001-12259 mentioned above, there is sometimes a case where the actual rotation speed of the engine is controlled so as to correspond to the target rotation speed irrespective of the load.

Figure 2:
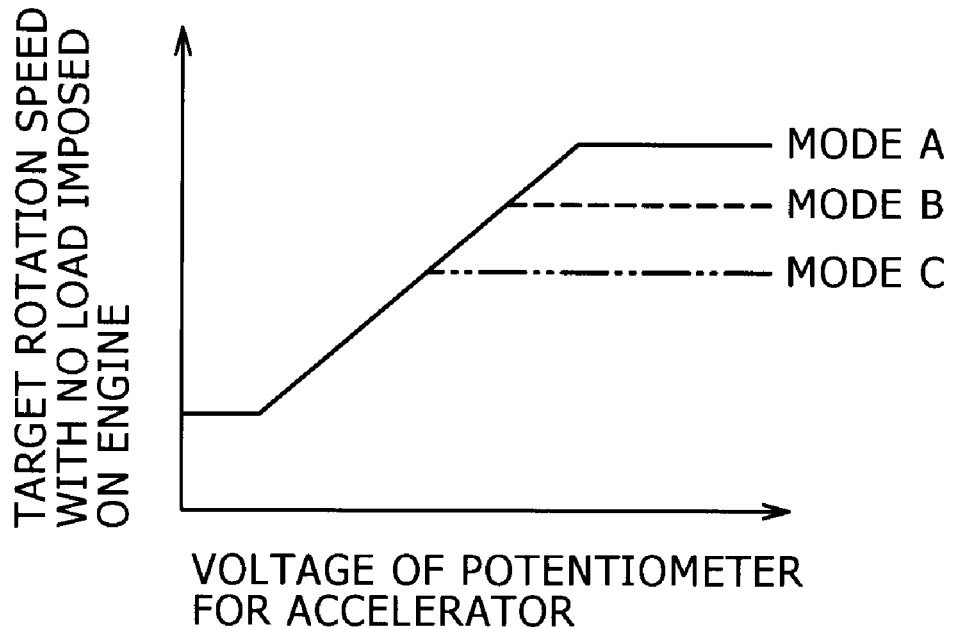
FIG. 2 is a view showing a relationship between an operation amount of a potentiometer for accelerator and selection of mode, and target rotation speed with no load imposed on an engine in the present embodiments.

FIG. 2 shows a case of the former (the case where the target rotation speed at the time of no load is set so as to control). A transverse axis of the figure shows an operation amount of the potentiometer for accelerator 21, and a vertical axis thereof shows the target rotation speed of the engine 10. Basically, in accordance with the operation amount of the potentiometer for accelerator 21, the target rotation speed is changed.

The mode selection switch 22 is to select a mode of the rotation speed of the engine 10 from three modes which are all different in terms of an upper limit value of the target rotation speed of the engine (Modes A, B and C in decreasing order of the upper limit value). For example, Mode A with the highest upper limit value is selected at the time of heavy work, Mode B is selected at the time of work giving an importance on an operation property, and Mode C with the lowest upper limit value is selected in the case where precedence is given to fuel consumption.

Operation signals of both mentioned above are inputted into controlling means 23 serving as both engine rotation speed controlling means and generator output controlling means. By both the signals, and a control signal from a controller 23 serving as the controlling means on the basis of a signal from an engine rotation speed sensor 24, a stepping motor 25 is driven and a position of a governor 26 of the engine 10 (rotation speed of the engine) is controlled.

Here, when the potentiometer for accelerator 21 is operated in the direction of accelerating the engine 10, or when the mode selection switch 22 is switched from a mode with a low upper limit value to a mode with a higher upper limit value (that is, an accelerating operation essentially), the controlling means 23 performs control for limiting a battery electrically charging operation by the generator motor 13, that is, the generator output in a process of accelerating the engine to set speed.

Contents of the above control will be described with reference to a flowchart of FIG. 4.

Figure 4:
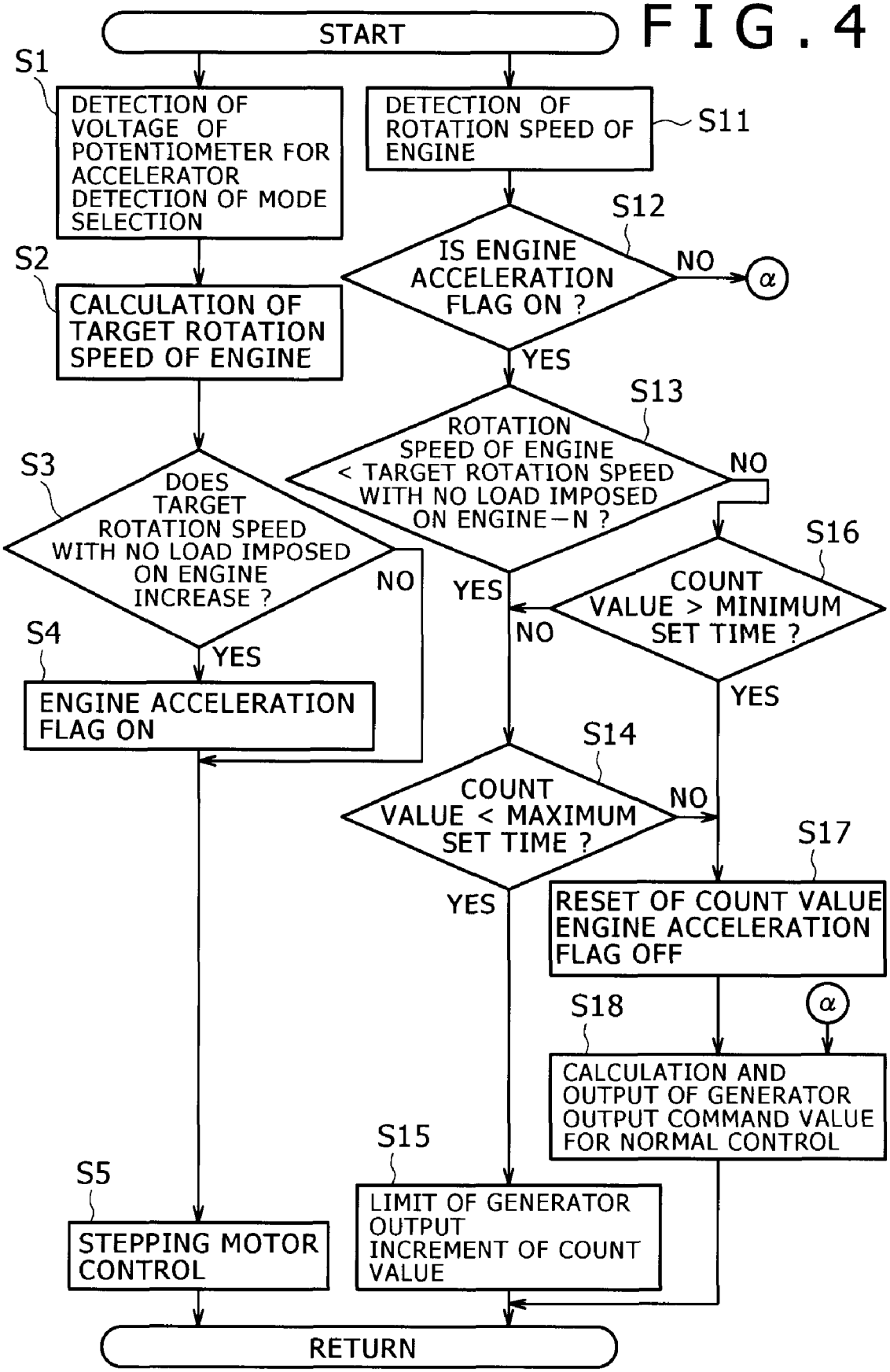
FIG. 4 is a flowchart for explaining an action of the present embodiments.

A routine on the left side in FIG. 4 shows a program for controlling the rotation speed of the engine by the potentiometer for accelerator 21 and the mode selection switch 22, and a routine on the right side shows a program for limiting/releasing the limit of the generator output.

In the routine on the left side, in Step S1, voltage (an operation amount) of the potentiometer for accelerator 21 and an operation signal (mode selection signal) of the mode selection switch 22 are respectively detected. In Step S2, the target rotation speed of the engine on the basis of the above operations is calculated from a characteristic of FIG. 2.

In the following Step S3, it is determined whether or not the target rotation speed of the engine is increased (whether or not it is an accelerating operation). After an engine acceleration flag is made ON in Step S4 in the case of YES (accelerating operation), or directly in the case of NO (not accelerating operation), stepping motor control (governor control) is performed in Step S5.

In the routine on the right side, the actual rotation speed of the engine 10 is detected in Step S11, and it is determined whether the engine acceleration flag is ON or not (whether it is accelerated or not) in Step S12.

Here, it is determined as YES (it is accelerated), the rotation speed of the engine and the set speed are compared to each other in Step S13.

As the set speed, the target rotation speed of the engine at the time of no load which is determined on the basis of the characteristic of FIG. 2 may be used. However, speed which is smaller than and the nearest from the above target rotation speed (target rotation speed−N) is used here. N denotes a value which is smaller than a change amount of the rotation speed of the engine due to the load at a governor position at the time, for example 200 rpm/min.

When it is determined as YES, that is, it is determined that the rotation speed of the engine does not reach the set speed yet in the above Step S13, in Step S14, a count value serving as an elapsed time from the beginning of acceleration due to an operation of the potentiometer for accelerator 21 or the mode selection switch 22 and a maximum set time which is predetermined are compared to each other.

The maximum set time is originally set as duration which is considered to be sufficient for the rotation speed of the engine to increase to the set speed (for example 5 seconds). It is determined as YES before the lapse of the maximum set time, and the generator output is limited in Step S15.

Figure 5:
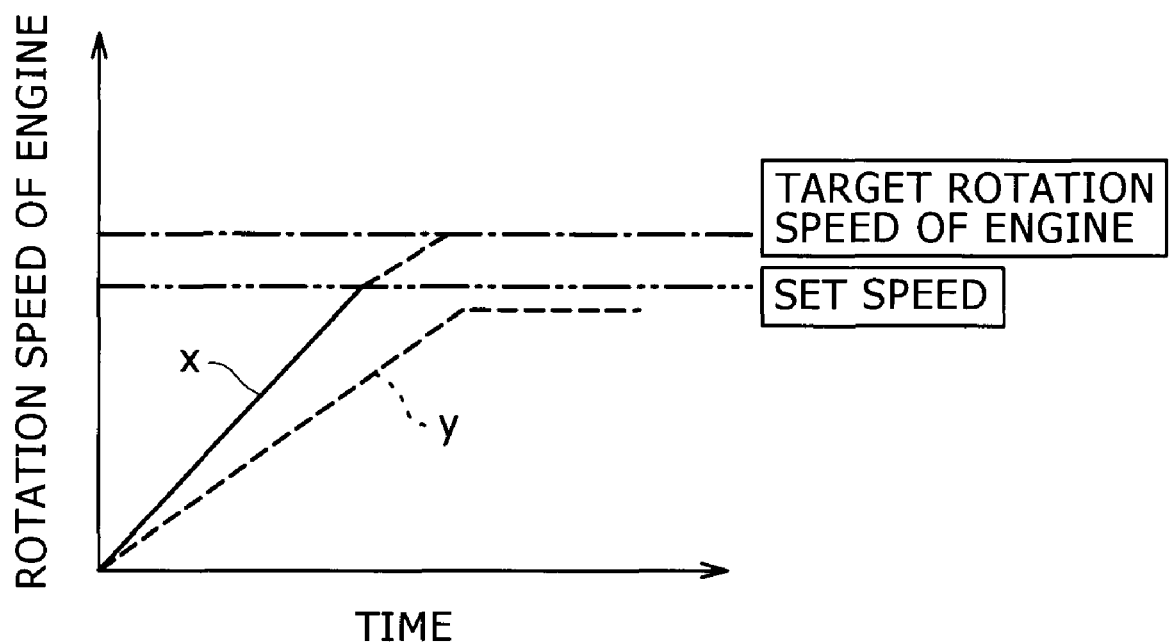
FIG. 5 is a view representing changes of the rotation speed of the engine over time in the case where the limit of the generator output is controlled and in the case where the limit is not controlled.

FIG. 5 represents an example of time changes in the rotation speed of the engine in the case where the limit of the generator output is controlled and in the case where the limit of the generator output is not controlled. A speed change x shown by a bold solid line in FIG. 5 is the case where the limit of the generator output is controlled, and a bold dotted line shows a state that the limit control is released after reaching the set speed. A speed change y shown by a thin dashed line is the case where the limit of the generator output is not controlled.

The limit of the generator output is performed by sending a command for largely reducing the generator output (torque) from the controlling means 23 to the controller for generator motor 16 in FIG. 1. By the above control, the generator output (battery electrically charging action) is decreased and the engine load is reduced so as to assist the acceleration.

The count value is incremented in Step S15 for preparing for the next time.

Meanwhile, it is determined as NO in Step S13, that is, it is determined that the acceleration is finished, the count value serving as the elapsed time from the beginning of acceleration and a minimum set time which is predetermined are compared to each other in Step S16.

The minimum set time is set as the minimum necessary duration for the rotation speed of the engine reaching the set speed and stabilizing from the beginning of acceleration. Within the time, it is determined as NO in Step S16 and the flow proceeds to Step S14 where the count value and the maximum set time are compared to each other.

Conversely, at the lapse of the minimum set time, it is determined as YES in Step S16. After the count value is reset and the engine acceleration flag is made OFF in Step S17, in Step S18, a generator output command value for normal control is calculated and outputted to the controller for generator motor 16 in FIG. 1. That is, the limit of the generator output is released.

It should be noted that in the case where it is determined as NO (the engine acceleration flag is not ON) in Step S12, the flow proceeds directly to Step S18 where the generator output command value for normal control is calculated and outputted.

The case where it is determined as NO (after the lapse of the maximum set time) in Step S14 is a case where the acceleration is not finished yet although the acceleration has to be finished by the time. In such a case, it is thought that there is a cause of the unfinished acceleration of the engine other than an influence of an increase in load of oil taking at the time of a low temperature, a decrease in engine output caused by operation at a high altitude or the like. Therefore, the limit of the generator output is meaningless for the purpose of assisting the acceleration of the engine.

The flow proceeds to Steps S17 and S18 where the limit of the generator output is stopped.

That is, the limit of the generator output is released at the earlier timing among the following:

(I) when the acceleration is finished (when the rotation speed of the engine reaches the set speed) and after the lapse of the minimum set time; and (II) before the rotation speed of the engine reaches the set speed and after the lapse of the maximum set time from the beginning of acceleration.

In such a way, at the time of accelerating the engine until the rotation speed of the engine reaches the set speed, the generator output is limited to output which does not disturb the acceleration of the engine. Therefore, it is possible to ensure an accelerating action of the engine.

According to the present embodiment, there are the following advantages.

(i) The target rotation speed of the engine 10 is predetermined as shown in FIG. 2 in relation to the operations of the potentiometer for accelerator 21 and the mode selection switch 22 as mentioned above. Therefore, the above target rotation speed may serve as the set speed and the limit of the generator output may be performed until the rotation speed of the engine reaches the target rotation speed. However, there is a possible case where the rotation speed of the engine takes a long time before reaching the target rotation speed. In such a case, the limit of the generator output, that is, a state of limiting electric charge is meaninglessly prolonged for a long time, and hence there is a possibility that a state of electrically charging the battery 20 is deteriorated.

Therefore, in Step S13, the generator output is limited taking the speed which is smaller than and the nearest from the target rotation speed (target rotation speed−N) as the set speed. Consequently, it is possible to avoid a situation that the limit endlessly continues and hence the state of electrically charging the battery 20 is deteriorated.

(ii) In the case where the rotation speed of the engine does not reach the set speed even after the lapse of a sufficient acceleration time (maximum set time) for example due to the influence of the increase in load of oil taking or the like, the limit of the generator output is released in Steps S14 to S18. Therefore, it is possible to ensure a sufficient electrically charging action without meaningless output limit.

(iii) When the acceleration of the engine 10 is finished, in theory the limit of the generator output may be immediately released. However, in such a way, due to a change of the rotation speed of the engine, the limit/release of the generator output has to be repeated and there is a fear that the control is unstable.

At this point, since the limit of the generator output is released after the lapse of the minimum set time by Steps S16 to S18, it is possible to stabilize the control.

Other Embodiments (1) In a machine where the mode selection is not performed (there is no mode selection switch 22), the set speed may be determined on the basis of only the operation of the potentiometer for accelerator 21.

(2) In the above embodiment, as the set speed in Step S13 of FIG. 4, the value which is smaller than and the nearest from the target rotation speed at the time of no load imposed on the engine is used. However, as the above set speed, the target rotation speed itself (shown by the solid line in FIGS. 2 and 3) may be used.

Not the target rotation speed at the time of no load imposed on the engine (shown by the solid line in FIGS. 2 and 3) but the target rotation speed in the case where the control is performed so that the actual rotation speed of the engine corresponds to the target rotation speed irrespective of the load, or the value which is smaller than and the nearest from the above target rotation speed may be used as the set speed.

In such a way, by using the target rotation speed for controlling the rotation speed of the engine, or the value which is the nearest from the above target rotation speed as the set speed, it is possible to omit separate setting means for determining the set speed.

Figure 3:
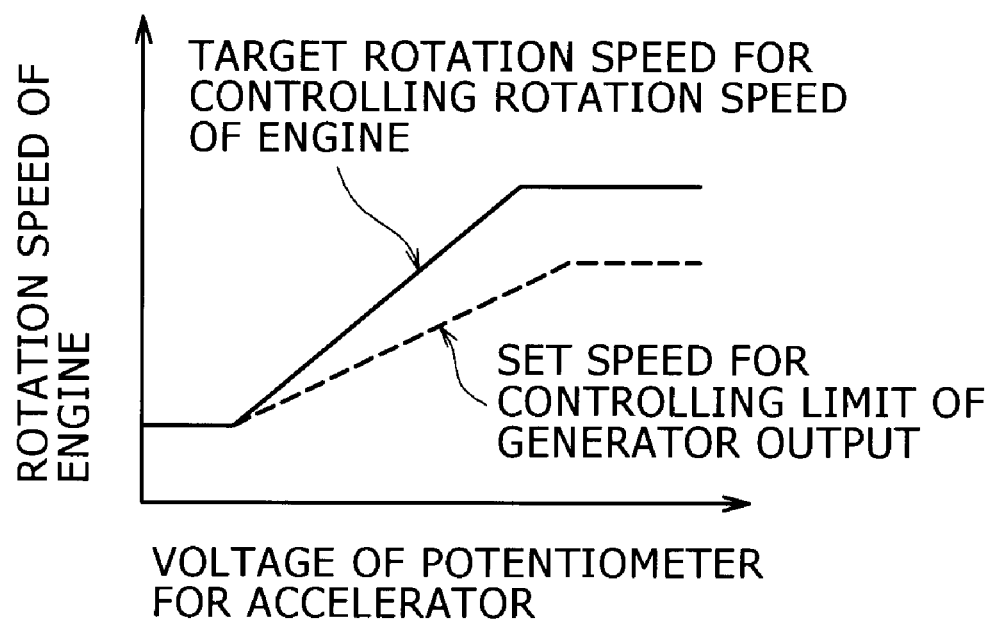
FIG. 3 is a view showing a relationship between the operation amount of the potentiometer for accelerator, target rotation speed for controlling rotation speed of the engine, and set speed for controlling limit of generator output.

Alternatively, as shown by a dashed line in FIG. 3, the speed determined in relation to the accelerator operation amount for controlling the limit of the generator output may be used as the set speed, aside from the target rotation speed for controlling the rotation speed of the engine.

In such a way, it is possible to select optimum speed in accordance with an action content or the like as the set speed for controlling the limit of the generator output irrespective of the target rotation speed of the engine.

(3) In the above embodiment, the limit is released at the lapse of the maximum set time from the beginning of acceleration, while the limit is released after the lapse of the minimum set time. However, the limit may be released only under the condition that the rotation speed of the engine reaches the set speed without performing the above processes.

Although the invention has been described with reference to the preferred embodiments in the attached figures, it is noted that equivalents may be employed and substitutions made herein without departing from the scope of the invention as recited in the claims.

We claim:

1. A hybrid working machine, comprising:
a hydraulic pump for driving a hydraulic actuator;
a generator motor for performing a generator action and a motor action;
an engine serving as a common power source for said hydraulic pump and said generator motor;

an electric storage device electrically charged by the generator action of said generator motor, the electric storage device being configured such that said generator motor is driven by electric power of the electric storage device so as to perform the motor action;

accelerator operating means for changing a fuel injection amount so as to control rotation speed of said engine; and generator output controlling means for controlling generator output of said generator motor, wherein said generator output controlling means for limiting the generator output in a process of accelerating the rotation speed of said engine to set speed determined on the basis of the operation of said accelerator operating means.

2. The hybrid working machine according to claim 1, wherein said generator output controlling means is configured so as to limit the generator output at the time of accelerating the rotation speed of said engine until the rotation speed of said engine reaches the set speed.

3. The hybrid working machine according to claim 2, wherein said generator output controlling means is configured so as to release the limit of the generator output before the rotation speed of said engine reaches the set speed and after the lapse of a maximum set time preset as the sufficient duration for reaching the set speed from the beginning of acceleration.

4. The hybrid working machine according to claim 1, wherein said generator output controlling means is configured so as to release the limit of the generator output at the time of accelerating said engine when the rotation speed of said engine reaches the set speed and after the lapse of a minimum set time preset as the minimum necessary duration for reaching the set speed and stabilizing from the beginning of acceleration of the rotation speed of said engine.

5. The hybrid working machine according to claim 1, wherein said generator output controlling means is configured so as to release the limit of the generator output at the time of accelerating the rotation speed of said engine at the earlier timing among the following:

(I) when the rotation speed of said engine reaches the set speed and after the lapse of a minimum set time preset as the minimum necessary duration for reaching the set speed and stabilizing from the beginning of acceleration of the rotation speed of said engine; and (II) before the rotation speed of said engine reaches the set speed and after the lapse of a maximum set time preset as the sufficient duration for reaching the set speed from the beginning of said acceleration.

6. The hybrid working machine according to claim 1, wherein said generator output controlling means is configured so as to limit the generator output taking target rotation speed for controlling the rotation speed of said engine preset in relation to an operation amount of said accelerator operating means as the set speed for limiting the generator output.

7. The hybrid working machine according to claim 1, wherein said generator output controlling means is configured so as to limit the generator output taking speed which is smaller than and the nearest from target rotation speed for controlling the rotation speed of said engine preset in relation to an operation amount of said accelerator operating means as the set speed.

8. The hybrid working machine according to claim 1, wherein said generator output controlling means is configured so as to limit the generator output taking rotation speed of said engine for limiting the generator output preset in relation to an operation amount of said accelerator operating means as the set speed, aside from target rotation speed for controlling the rotation speed of said engine.

* * * * *